United States Patent [19]
Maddalozzo, Jr. et al.

[11] Patent Number: 6,012,093
[45] Date of Patent: Jan. 4, 2000

[54] METHOD AND APPARATUS FOR MODIFICATION OF NETWORK LINK HISTORIES

[75] Inventors: John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 08/874,809

[22] Filed: Jun. 13, 1997

[51] Int. Cl.$^7$ ............................... G06F 7/14; G06F 7/22
[52] U.S. Cl. ........................................ 709/223; 707/513
[58] Field of Search .................................. 707/103, 104, 707/501, 500, 513, 200; 395/200.33, 200.53, 200.54; 709/203, 223, 224

[56] References Cited

U.S. PATENT DOCUMENTS

| | | | |
|---|---|---|---|
| 4,975,690 | 12/1990 | Torres | 340/721 |
| 5,023,851 | 6/1991 | Murray et al. | 368/41 |
| 5,204,947 | 4/1993 | Bernstein et al. | 395/157 |
| 5,673,322 | 9/1997 | Pepe et al. | 380/49 |
| 5,724,595 | 3/1998 | Gentner | 395/762 |
| 5,732,074 | 3/1998 | Spaur et al. | 370/313 |
| 5,761,436 | 6/1998 | Nielsen | 395/200.75 |
| 5,768,578 | 6/1998 | Kirk et al. | 395/611 |
| 5,812,134 | 9/1998 | Pooser et al. | 345/356 |

OTHER PUBLICATIONS

Windows Magazine–Sep. 1996, v7, n9, p208(2), Methvin, David W.; "Make your browsers fit better", Sep. 1996.
"Special Edition: Using Netscape 2", Que Corporation, Brown, Mark; ISBN: 0–7897–0612–1, Dec. 1995.
Smart Browser Home Page, "History Tree" SW Product; http://www.vuw.ac.nz/...Katipo.html; "Katipo" SW Product.

*Primary Examiner*—Mark H. Rinehart
*Assistant Examiner*—Marc D Thompson
*Attorney, Agent, or Firm*—Robert V. Wilder; Richard A. Henkler

[57] ABSTRACT

A method and implementing system 101, are provided in which a computer system is arranged for connection 210 to a network system such as the Internet. A user of the computer system may selectively display 401 a listing of network data path and site history files from previous network sessions, and select one or more items from the list for modification 407, 409, 411. The user may then modify the current history file by creating 411, 701 a new current history file. A new current history file may also be modified by exchanging 407, 501 or appending 409, 601 the selected and modified selected items with the current history file to create a new current history file. The newly created history file then includes data paths and/or portions thereof, which were successfully used in previous network sessions.

13 Claims, 6 Drawing Sheets

METHOD AND APPARATUS FOR MODIFICATION OF NETWORK LINK HISTORIES

FIELD OF THE INVENTION

The present invention relates generally to information processing systems and more particularly to an improved methodology for information management in network and telecommunications systems and databases accessible through such systems.

BACKGROUND OF THE INVENTION

As computer systems and networked computer systems proliferate, information access time becomes more critical. For many reasons, access time to information databases has a tendency to increase even with frequent equipment upgrades and technology advances. This tendency is apparent in mostly all database accesses which involve telecommunications links and is especially visible to the growing number of users of the Internet and worldwide web applications.

Most Internet applications provide a user a plurality of selections for accomplishing a "search" for specific information in which a user may be interested. In those cases, the access speed may depend upon the search engine program design and also upon the data path and interim sites selected, and also the selected telecommunications link.

Once a user selects a search engine and then later selects one or more data paths, that path history is typically saved in the user's hard drive. However, if the user "logs-off" from a browser session, and then later wishes to return to the same site or to an intermediate site of the earlier history, the user must initiate a new log-on procedure and re-select each sequential site of the earlier data path until the user arrives at the site he wishes to re-visit or to advance from. This process is long, tedious and time-consuming.

In another application, when a user is attempting to re-create a data path which the user had established during an earlier web session, the user must attempt to re-create the data paths previously established through the user's recall. That method is often faulty and unreliable and the user is frequently unable to re-establish an earlier search or data path.

In other situations, a user may wish to organize his prior Internet or "web" searches by one or more categories, or the user may wish to edit his prior web searches by creating efficient data base paths which have proven to be the most productive. Further, even during current sessions, a user may wish to re-organize his "current" data path history by appending the more efficient current search paths to previous search paths established on earlier Internet sessions, or by appending, at key points, earlier search paths or portions thereof, to a present search path history.

Accordingly, there is a need for an enhanced method and processing apparatus which is effective to allow a user to select, organize and/or manipulate prior established data paths for use in present or future data access activities in order to expedite the data or information searching process without requiring the user to re-create the previously used data path by means of a sequential site-by-site log-on access protocol.

SUMMARY OF THE INVENTION

A method and apparatus is provided in which a data path history management program is operable to selectively re-arrange and manipulate present and past data path history files in order to switch or substitute data path history files between present and past sessions, in order to expedite the establishment of an efficient and proven search path. Selection screens prompt user choice selections to enable a user to design and establish new data paths combining present and previously established data paths and data path histories.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
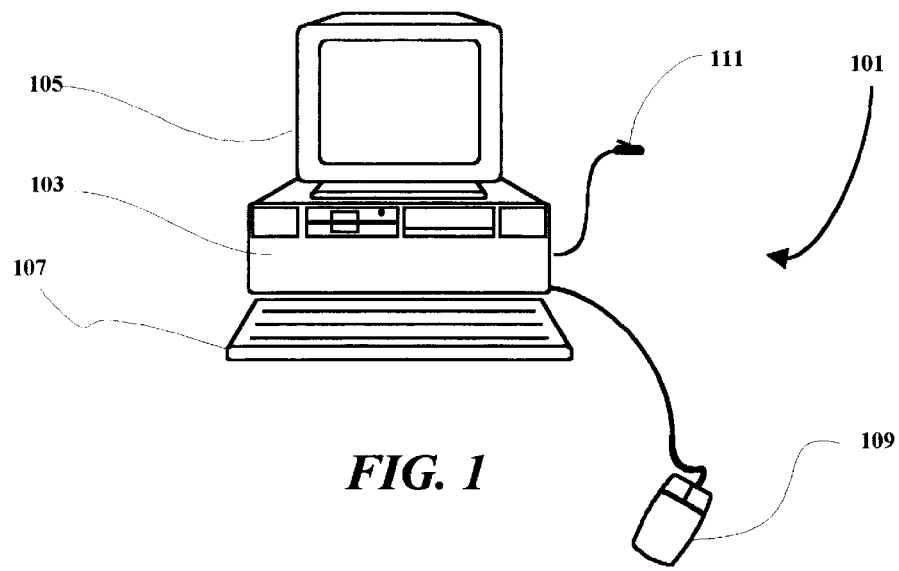
FIG. 1 is a diagram of a computer system in which the present invention may be implemented.

With reference to FIG. 1, the various methods discussed herein may be implemented within a typical computer system 101 which may include a workstation or personal computer. In general, an implementing computer system may include a plurality of processors in a multi-bus system in a network of similar systems. However, since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example. The present invention may also be implemented in a cellular system in which case the connector 111 would not be required.

Figure 2:
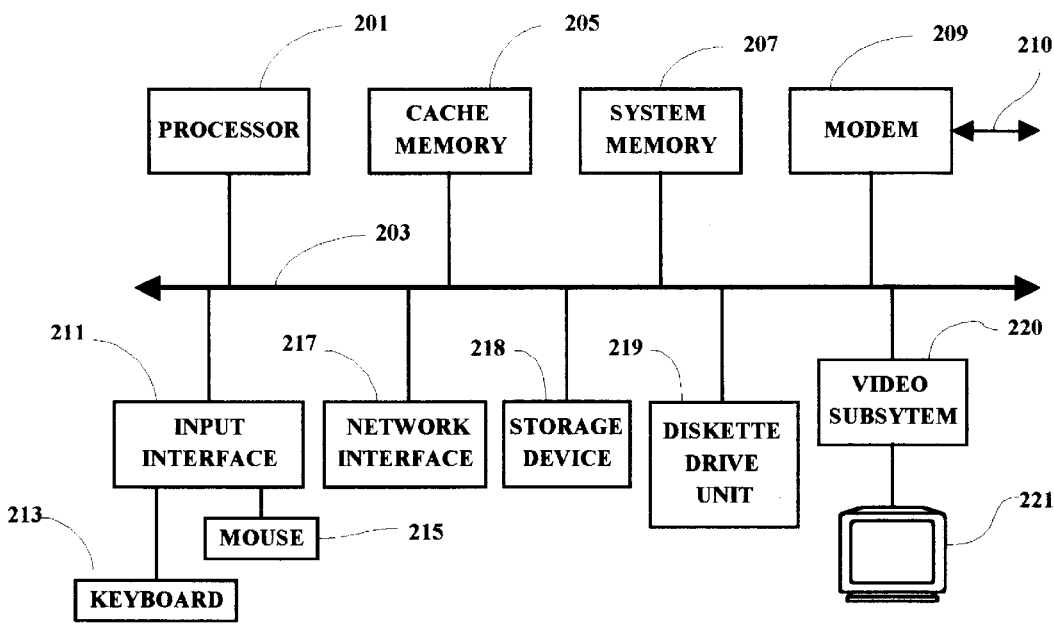
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a network interface subsystem 217 and a diskette drive unit 219. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette.

In running an Internet access program or browser program on the computer system 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. As a program is running, either a portion of the program or the entire program may be loaded into the system memory 207 and/or the system cache memory 205. Depending on specific program design, the system may store any information accessed from a database in the storage unit 218, the cache memory 205, the system memory 207 or directly from a diskette loaded into the diskette drive 219. Assuming a user has started-up the system, and is actively running an Internet program from memory, a series of screens will be displayed to the user on the display device 221. Each screen typically has one or more selections for the user to make in navigating through the program. In general, a user will make selections from a display screen using the keyboard 213 or the mouse or pointer device 215. In an Internet operating program, the selections made by the user will determine "where" the user "goes", i.e. to what "site", and also, in some cases, the communications link or the path taken to get to the site selected.

Figure 3:
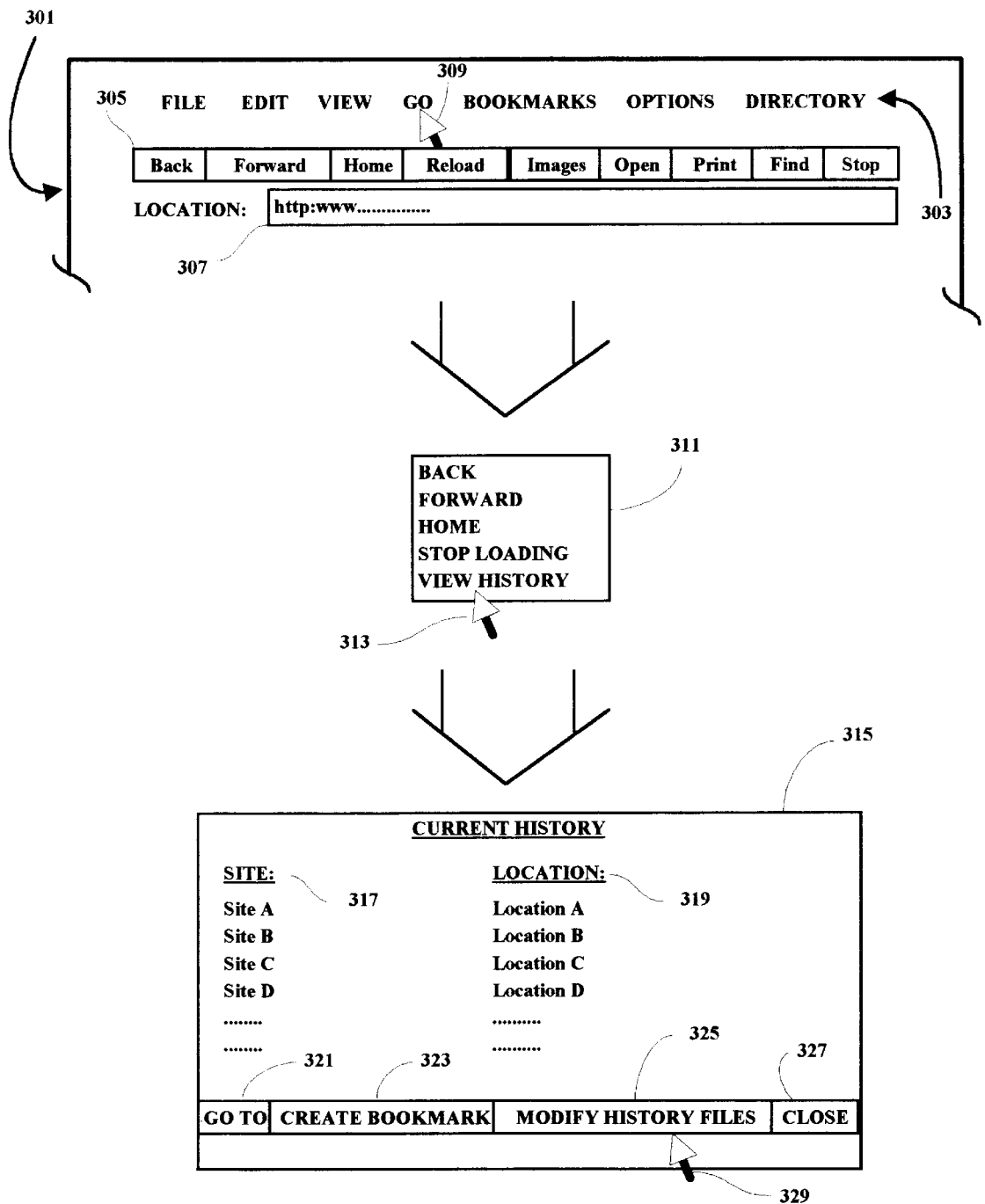
FIG. 3 is a schematic illustration of an exemplary display screen with display sequences for reference in explaining the present invention.

FIG. 3 illustrates a typical program screen display 301 in an Internet operating session. The screen generally includes a row or group of operating tools 303 from which a user may select by pointing a pointer 309 using the mouse device 215, for example. The screen also shows another row of selectable commands 305, and an address or "location" block 307. In general, the commands 305 are selectively chosen by a user in operating an Internet program and moving from one Internet site to another. The STOP button may be selected and invoked if the user wishes to terminate or stop a transmission of data from another computer or server.

In many cases, a user will request a data transfer or to go to a selected site by typing in an site address in the location box 305. As a user moves from one site to another site during an Internet or web session, a "history" of the addresses of the sites visited is typically created and maintained by the browser program. If at any time during a session, a user wishes to go to an earlier visited site directly from the user's current site, the user may "point-and-click", using the pointer 309, on the GO command, as shown in FIG. 3, and the screen will display a selection box 311. From the selection box 311, a user may select a "VIEW HISTORY" listing with the pointer 313, and a "CURRENT HISTORY" screen 315 will be presented on the display. The current history screen 315 includes a listing of sites 317 which have been visited by the user during the current Internet session as well as a corresponding listing of addresses or locations 319 for the displayed sites 317. In the present example, a series of command selections is displayed at the lower edge of the screen 315. The displayed commands in the present example include a "GO TO" command 321 which may be selected by a user in order to "go to" a highlighted site. A "CREATE BOOKMARK" command is also illustrated 323 and may be selected by a user to add one or more highlighted sites to a list of sites frequently visited by the user. Typically the BOOKMARK listing is neither grouped together in a logical sense, nor "linked" together in an electronic data path sense. The current history screen also includes a "MODIFY HISTORY FILES" selection 325 and a "CLOSE" selection 327. If a user wishes to return to a previous screen from the current history screen 315, the used would select or point and click on the CLOSE button 327 and the user would be returned to one of the previous screens, such as screen 311 or screen 301, depending on the program designer's flow.

Figure 4:
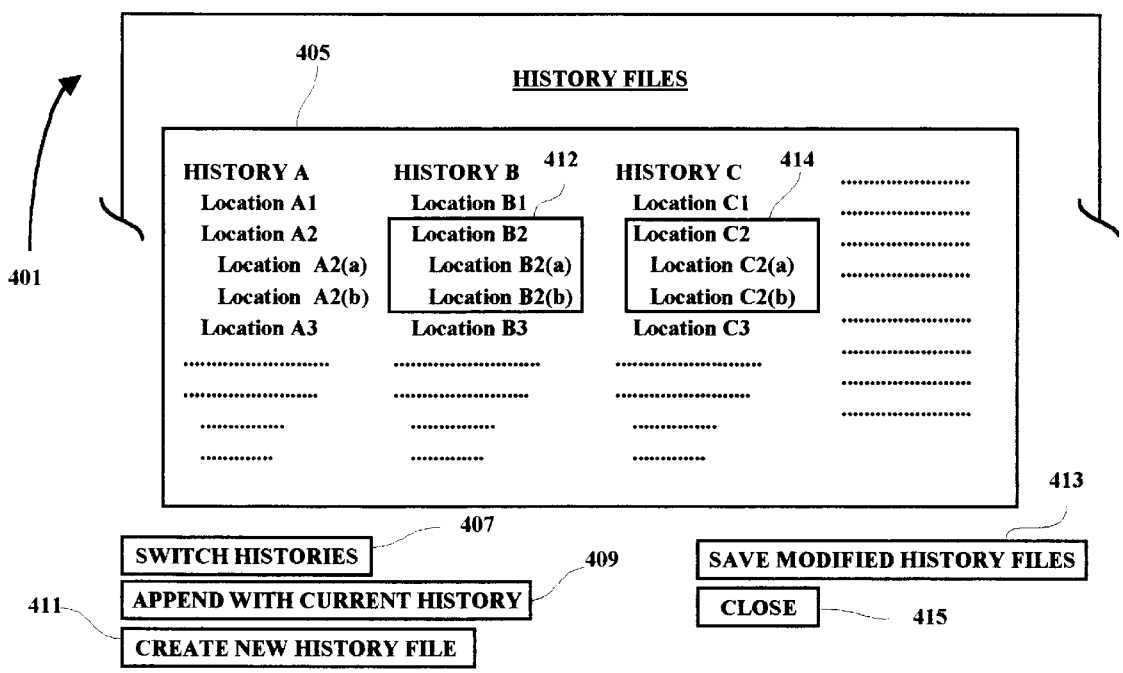
FIG. 4 is an illustration of a portion of an exemplary screen display which may be implemented in accordance with the present invention.

In the present example, when a user selects the MODIFY HISTORY FILES choice 325 with the pointer 329 or other means of selection, a HISTORY FILES screen 401, as illustrated in FIG. 4, is displayed to the user. In accordance with the exemplary embodiment, the HISTORY FILES screen 401 includes a screen area 405 in which a listing of prior data path histories (HISTORY A, HISTORY B, HISTORY C etc.) from prior Internet sessions or prior history file modifications is presented. In one area of the screen, several command buttons or selections are displayed including SWITCH HISTORIES 407, which allows a user to exchange the user's current history file with one developed earlier and presented on the display 401. Another command APPEND WITH CURRENT HISTORY 409 allows a user to append one of the listed histories to the user's current history. If the user selects either the SWITCH 407 or the APPEND 409 option, the program will operate to switch history files or append history files in accordance with listed entries which the user may highlight or select in conjunction with the selection of the switch or append functions. Another optional selection is designated CREATE NEW HISTORY FILE 411 which allows a user to create a new file from components or portions of data paths highlighted or selected from the paths listed. Another selection option SAVE MODIFIED HISTORY FILES 413 allows a user to save the files which the user has modified as the current working file or as a stored but retrievable new file for future reference. The CLOSE button 415 may also be selected to return a user to a previous screen or to close the MODIFY HISTORY FILES function and return to the basic browser programming.

Figure 5:
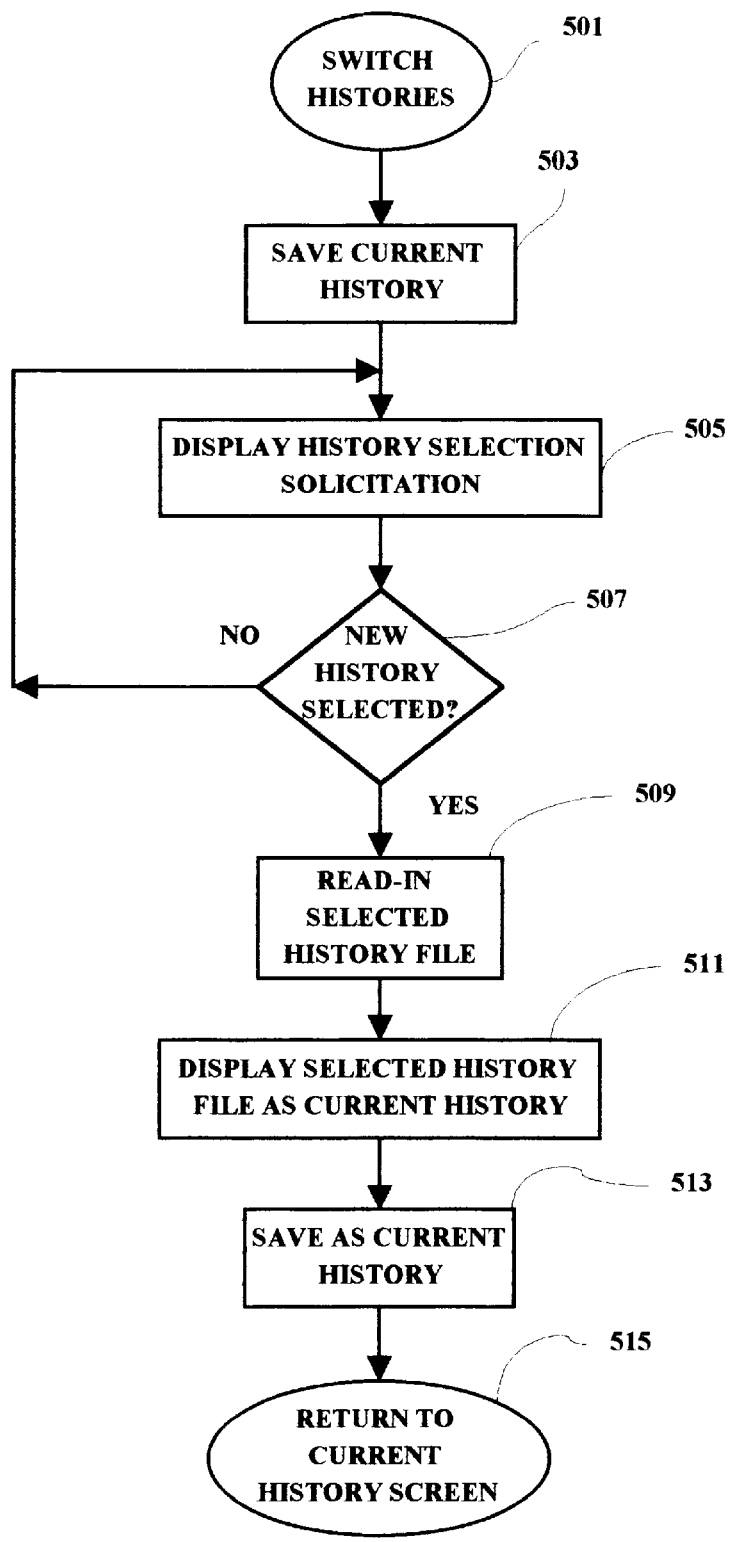
FIG. 5 is a flow chart illustrating the methodology implemented in one operational aspect of the disclosed exemplary embodiment.
Figure 6:
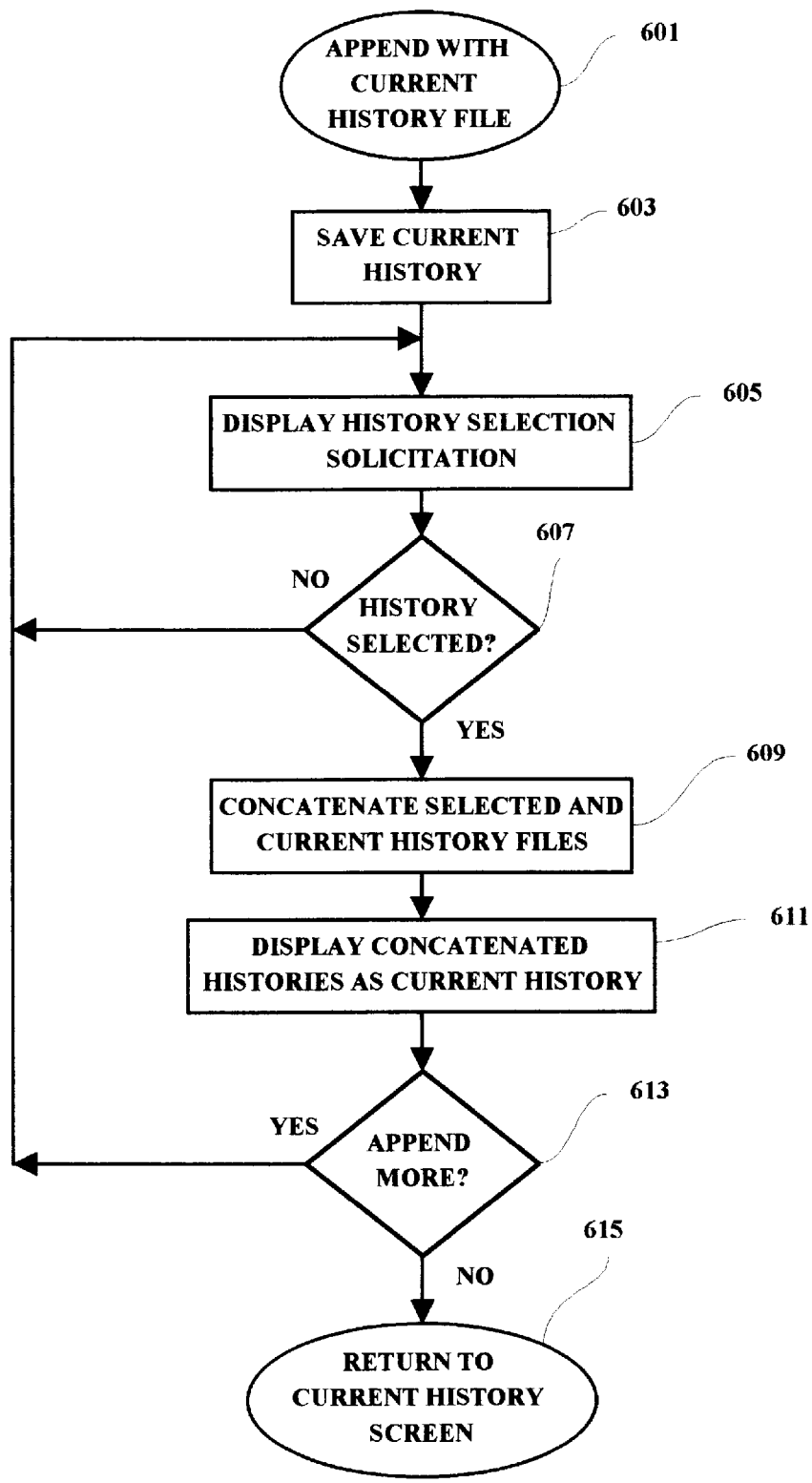
FIG. 6 is a flow chart illustrating the methodology implemented in another operational aspect of the disclosed exemplary embodiment.
Figure 7:
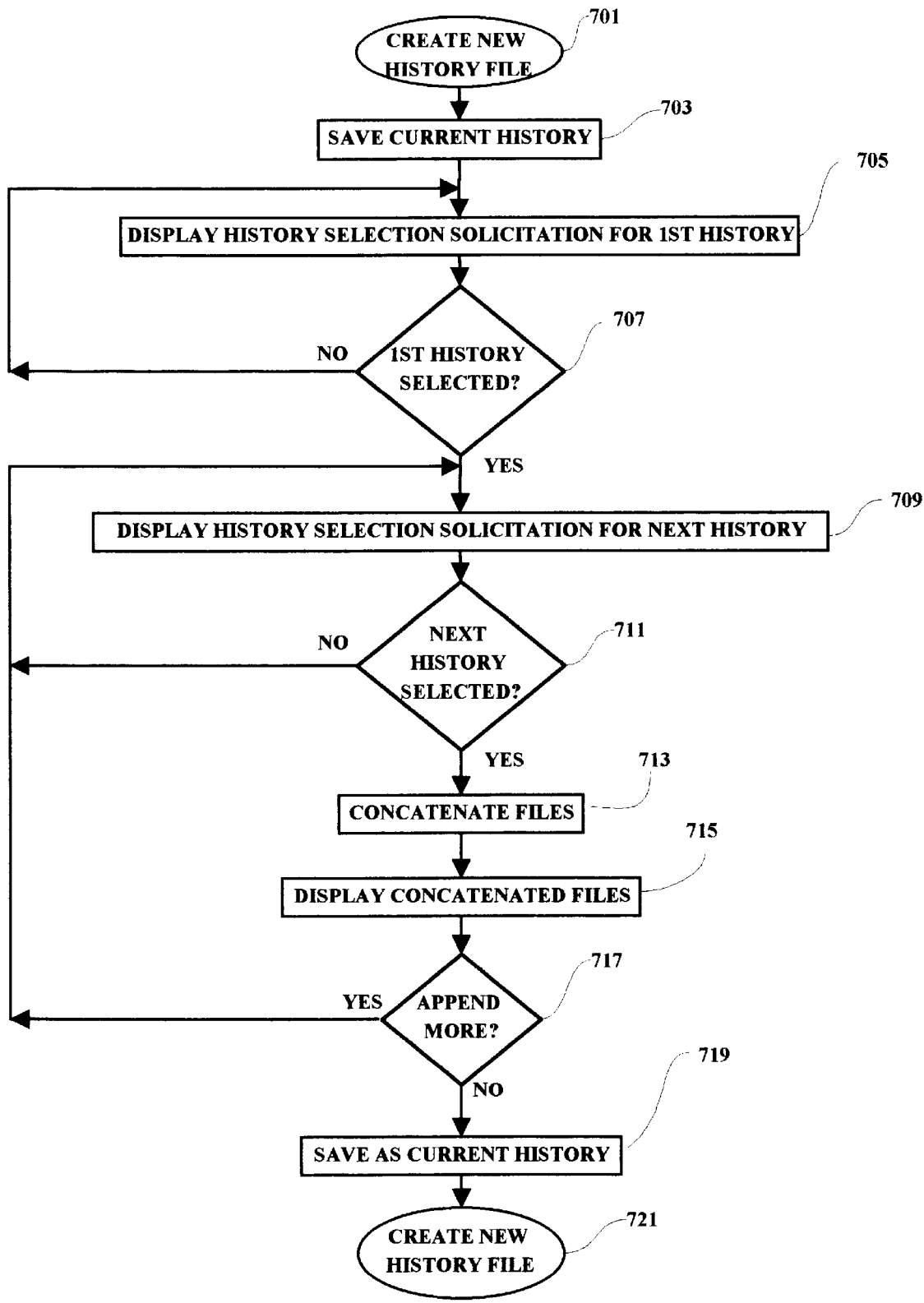
FIG. 7 is a flow chart illustrating the methodology implemented in yet another operational aspect of the disclosed exemplary embodiment.

In operation, when a user selects the "MODIFY HISTORY FILES" button 325, and then selects the "SWITCH HISTORIES" option 407, the operational flow illustrated in FIG. 5 occurs. Specifically, when the SWITCH function is called 501 the current working history file is saved 503, and a display is presented which prompts the user to select or highlight the particular history on the listing 405 which the user wishes to substitute or switch with the user's current history from a current Internet session. When the user makes a selection 507 of one of the history files which is to become the new current history file, the selected history file is read-in 509 and the display 401 will present the selected file as the current history file 511, and save the modified switched file as the current history file 513. The save function may also be a selectable feature to enable the user to select not to save the switched file as the current history file. After saving, the program would then return the user to the current history screen 315, and the switched or modified history file selected by the user would appear as the "current history". The user would then be able to move to any site in the history by highlighting the particular site and then selecting the GO TO function 321.

When a user wishes not to switch histories but rather only to append a listed history file to a current history file, the user would select the APPEND button 409 from screen 401. Optional display screens could be presented to allow the user to select whether to append a selected file to the end of the current file or at the beginning of the current file. In any event, when the APPEND option is selected 409, 601, the program will first save the current history file 603 and display a history selection solicitation 605 on the display screen to prompt the user to select or highlight the particular history file listed 405 that the user wishes to append to the current file. Once that history is selected 607, the program will concatenate or combine 609 the selected history file with the current history file, and display the modified or appended file 611 as the current file 611. The program may also include an option for the user to append additional files 613 before returning the user to the current history screen 315 in which the modified or appended file would now be presented as the "CURRENT HISTORY".

Another manner in which a current history file may be modified to provide a user with the benefit of prior searches, would be for the user to select the CREATE NEW HISTORY FILE option 411 from the HISTORY FILES screen 401. Once selected, the CREATE NEW option 701 would begin by saving the current history 703 and displaying a history selection solicitation 705 to the user to prompt the user to select or highlight the particular histories or sites which the user would identify as, for example, a first site group or first history group 412. After that selection has been made 707, the user would be presented with another selection solicitation 709 to prompt the user to select another site group or site history, for example group 414, as a next site group or next history. In this function, a user would be able to select any entire listed history as the first or the second history, and the user may also be prompted to select sites or portions of the listed histories, such as portions 412 and 414, as the first or the second history for purposes of concatenating the first and second selections 412 and 414. After the second or "next" history portion has been selected 711, the selected files or file portions are concatenated 713 or joined together to create or form a new history file comprised only of the selected sections 412 and 414 for example, which may then be displayed 715 for user review. At that point, the user may be prompted by an appropriate display as to whether the user wishes to append additional files or sites 717 to the modified new file. If additional appending is desired, the program returns to the "DISPLAY HISTORY" block 709 to allow the user to make additional selections. When no further appending or modification is desired, the newly created and modified file is saved as the current history 719 and the program returns to the CURRENT HISTORY screen 315 showing the newly created modified file as the "current File".

By using the disclosed methodology, a computer system user is able to gain the benefit of modifying past history files in order to create new files which may be more focused on specific subjects or which have been found to be more efficient in searching for desired information. A user is also able to organize search files in any manner the user may desire to provide a more efficient and productive Internet information access methodology.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The monitoring methodology may also be implemented solely in program code stored on a disk or diskette (portable or fixed), or other memory device, from which it may be executed to monitor and/or report system resource conditions as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for modifying history files in a computer system in which the computer system is selectively arranged for interaction with remote sites through a network system, and wherein the computer system is enabled during network connection sessions to automatically provide a history listing of all remote site locations visited during each of said network connection sessions, said method comprising:

displaying a selection screen, said selection screen including at least one history listing, said selection screen being arranged to prompt a user to choose a selected plurality of groups of said remote site locations from said history listing of remote site locations; and combining said selected groups of said remote site locations in accordance with a user-selected modification option to provide a new history listing including said combined selected groups of said remote site locations.

2. The method as set forth in claim 1 wherein said selection screen includes a plurality of history listings saved from prior network connection sessions, and whereas at least one of said selected groups of said remote site locations comprises an entire one of said history listings.

3. The method as set forth in claim 1 and further including saving said history listings including said new history listing in non-volatile memory.

4. The method as set forth in claim 1 and after said modifying, said method further including:

displaying said new history file to the user on a current history screen.

5. The method as set forth in claim 1 wherein said network system includes remote site locations on an Internet system.

6. The method as set forth in claim 1 wherein said network is accessible through wireless communication links.

7. A storage medium including machine readable indicia, said storage medium being selectively coupled to a reading device, said reading device being selectively coupled to processing circuitry within a computer system, said reading device being selectively operable to read said machine readable indicia and provide program signals representative thereof, said computer system being further selectively arranged for interaction with remote sites through a network system, and wherein the computer system is enabled during network connection sessions to automatically provide a history listing of all remote site locations visited during each of said network connection sessions, said program signals being selectively operable to accomplish the steps of:

displaying a selection screen, said selection screen including at least one history listing, said selection screen being arranged to prompt a user to choose a selected plurality of groups of said remote site locations from said history listing of remote site locations; and combining said selected groups of said remote site locations in accordance with a user-selected modification option to provide a new history listing including said combined selected groups of said remote site locations.

8. The storage medium as set forth in claim 7 wherein said selection screen includes a plurality of history listings saved from prior network connection sessions, and whereas at least one of said selected groups of said remote site locations comprises an entire one of said history listings.

9. The storage medium as set forth in claim 7 and further including saving said history listings including said new history listing in non-volatile memory.

10. The storage medium as set forth in claim 7 and after said modifying, said program signals being further effective for:

displaying said new history file to the user on a current history screen.

11. The storage medium as set forth in claim 7 wherein said network system includes remote site locations on an Internet system.

12. The storage medium as set forth in claim 7 wherein said network is accessible through wireless communication links.

13. A computer system comprising:

a processing device;

a memory unit; and a bus connecting said processing device and said memory unit, said processing device being selectively operable for executing a program from said memory for modifying history files in said computer system, said computer system being selectively arranged for interaction with remote sites through a network system, and wherein said computer system is enabled during network connection sessions to automatically provide a history listing of all remote site locations visited during each of said network connection sessions, said program being selectively operable for:

displaying a selection screen, said selection screen including at least one history listing, said selection screen being arranged to prompt a user to choose a selected plurality of groups of said remote site locations from said history listing of remote site locations; and combining said selected groups of said remote site locations in accordance with a user-selected modification option to provide a new history listing including said combined selected groups of said remote site locations.

* * * * *